United States Patent [19]

Bronstert et al.

[11] Patent Number: 5,625,008
[45] Date of Patent: Apr. 29, 1997

[54] PREPARATION OF TELECHELIC STRUCTURES

[75] Inventors: Klaus Bronstert, Carlsberg; Konrad Knoll, Mannheim, both of Germany

[73] Assignee: BASF Aktiengesellschaft, Ludwigshafen, Germany

[21] Appl. No.: 314,954

[22] Filed: Sep. 29, 1994

[30] Foreign Application Priority Data

Oct. 15, 1993 [DE] Germany ............... 43 35 220.0

[51] Int. Cl.⁶ ............................................. C08C 19/00
[52] U.S. Cl. .................... 525/333.1; 525/333.2; 525/383
[58] Field of Search ................. 525/333.1, 333.2, 525/383

[56] References Cited

U.S. PATENT DOCUMENTS

| | | | |
|---|---|---|---|
| 3,786,116 | 1/1974 | Milkovich et al. | 260/885 |
| 4,083,834 | 4/1978 | Komatsu et al. | 526/55 |
| 4,552,461 | 11/1985 | Ott et al. | 366/279 |
| 4,861,742 | 8/1989 | Bronstert et al. | 502/157 |
| 5,081,251 | 1/1992 | Bender et al. | 546/350 |
| 5,122,544 | 6/1992 | Bailey et al. | 521/40 |
| 5,171,800 | 12/1992 | Bronstert | 526/173 |

FOREIGN PATENT DOCUMENTS

| | | |
|---|---|---|
| 405327 | 6/1990 | European Pat. Off. . |
| 434124 | 6/1991 | European Pat. Off. . |
| 305909 | 1/1992 | European Pat. Off. . |
| 363659 | 1/1993 | European Pat. Off. . |
| 2364931 | 9/1976 | France . |
| 1240711 | 7/1971 | United Kingdom . |

Primary Examiner—Thomas R. Weber
Attorney, Agent, or Firm—Keil & Weinkauf

[57] ABSTRACT

Telecheles are prepared by reacting, preferably, polyfunctional, living polymers obtained by anionic polymerization with a functionalizing agent by a process in which the reaction is carried out while stirring with a stirrer having knife-like blades as stirring elements, the latter being inclined relative to their plane of movement and passing over essentially the complete space occupied by the reaction mixture.

3 Claims, 1 Drawing Sheet

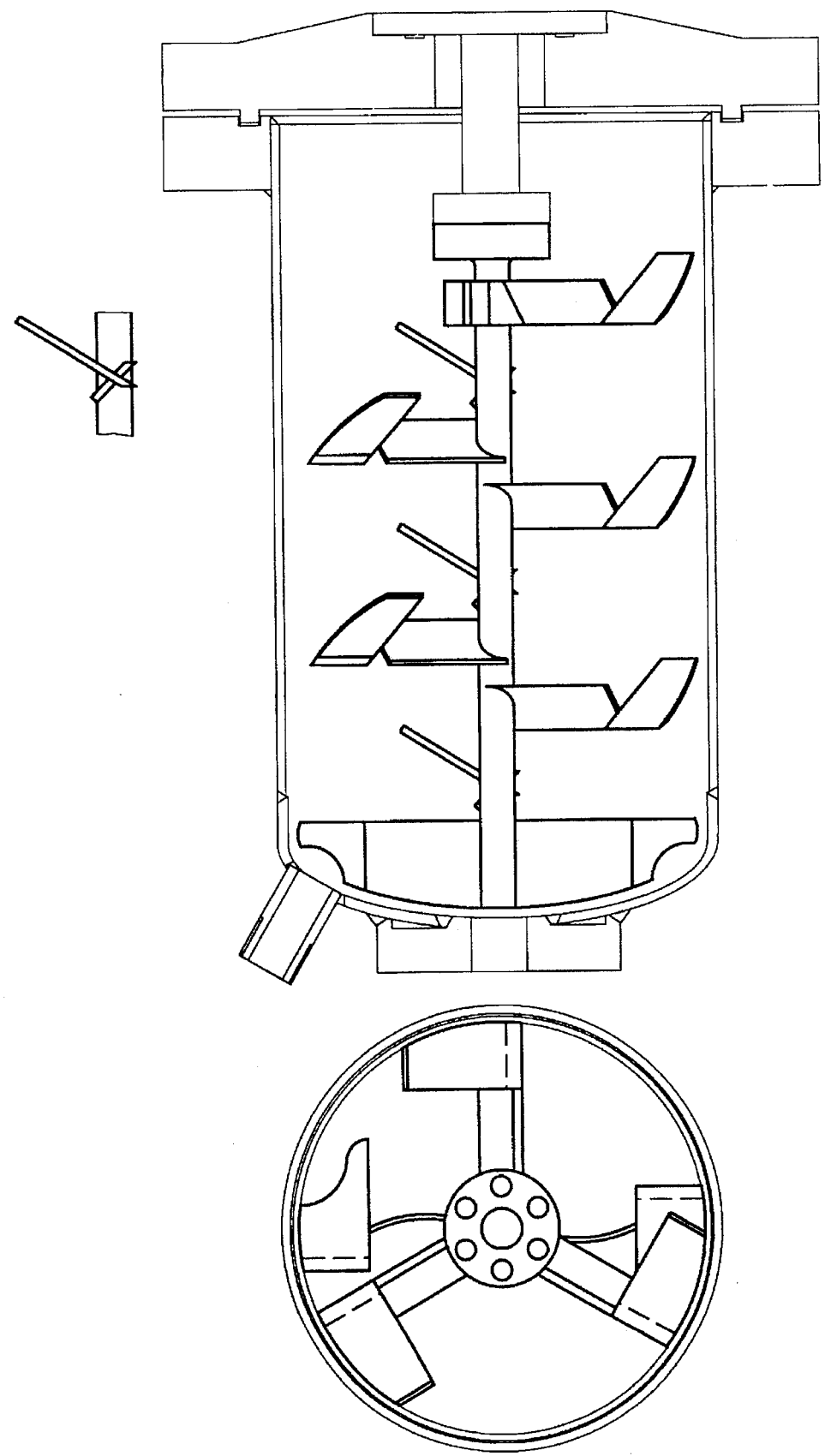

PREPARATION OF TELECHELIC STRUCTURES

BACKGROUND OF THE INVENTION

1. Field of the Invention

This invention relates to a process for preparing telechelic structures.

2. Description of Related Art

Telechelic structures are polymers whose chain ends contain functional groups, eg. —OH, —SH, —NH$_2$, etc. They may serve as building polyesters, etc., polymers functionalized at both chain ends being particularly important.

The anionic polymerization of, for example, butadiene or isoprene with in particular bifunctional dilithium initiators in hydrocarbons is a particularly suitable process for the synthesis of diene telechelic structures. It gives living polymers having a narrow molecular weight distribution and suitable microstructure, since high proportions of the dienes are incorporated in the 1,4 configuration. Suitable initiators are also known (for example EP 305909 (1988), EP 363659 (1989) or EP 405327 (1990)). The living polymers exhibiting bifunctional growth are then converted into the telechelic structures by polymer-analogous reaction with suitable functionalizing reagents.

Particularly desirable telechelic structures are those having terminal primary or secondary hydroxyl groups, which are prepared in a preferred process (cf. for example U.S. Pat. No. 3,786,116 which is incorporated herein by reference) by reacting the living polymers with epoxides, eg. ethylene oxide or propylene oxide.

Very stable associates of the chain ends are formed by the conversion of the (less polar) organolithium terminal groups into strongly polar lithium alcoholate terminal groups, leading to a dramatic increase in viscosity or, in the case of functionalization which results in more than 40–50% of bifunctional species, to gelling of the reaction material owing to physical crosslinking. Because of the high reaction rate, gelling begins almost immediately after the addition of the terminating reagent, the uniform incorporation of which by mixing is thus prevented. The consequences are incomplete reaction and a lower quality of the telechelic structures, and possibly also blocking of the stirrer or even damage to the plant parts. It is true that termination can be realized at low concentrations; however, such a procedure is uneconomical. There was therefore a need for a process which permits termination with formation of polar terminal groups without these hindrances and at high polymer concentration.

It is an object of the present invention to provide such a process.

SUMMARY OF THE INVENTION

We have found this object is achieved by the novel process in which the gel formed during thorough mixing of the reactants is cut by means of a stirrer having knife-like blades, resulting in a finely divided powder in which the reaction takes place with short diffusion paths.

BRIEF DESCRIPTION OF THE DRAWING

The sole drawing FIGURE schematically depicts a reactor employed in effecting the process according to the present invention, and particularly shows stirrer elements having edges in the form of knives which are inclined relative to their plane of movement so that they will pass over the complete space occupied by a reaction mixture contained therein.

DESCRIPTION OF THE PREFERRED EMBODIMENTS

The present invention therefore directly relates to a process for the preparation of telechelic structures by reacting, preferably, polyfunctional living polymers obtained by anionic polymerization with a functionalizing agent while stirring with a stirrer having knife-like blades as stirring elements, the latter being inclined relative to their plane of movement and passing over essentially the complete space occupied by the reaction mixture. In the novel process, the terminating reagent can be mixed in over a very short time. As usual, there is initially a sharp increase in viscosity, which results in a corresponding increase in the stirrer torque. The knife-like blades of the stirrer then surprisingly cut the gel formed into an increasingly fine powder which has a bulk volume which is about 2 to 3 times that of the starting solution. The reaction is continued in this powder bed with further stirring until it is complete, which is generally the case after up to 3 hours. This is followed by protonation and, as described in the Examples below, working up.

The stirrer should not be switched off before the telechelic structure is released from the alcoholate, since otherwise the powder gradually collapses into a gel again and it is then difficult to put the stirrer into operation again.

The powder reaction product appears to be moist only at a low concentration of the starting solution (eg. 5–10%) but is dry at higher concentration (but nevertheless with a solvent content of from 50 to 70%). With the novel process, complete conversion is possible even in the case of starting concentrations having a solids content of over 30%.

The solutions of the living polymer which are used for the termination may be homogeneous or in the form of dispersions in suitable hydrocarbons. Homogeneous solutions are, for example, the mixtures obtained by polymerization of dienes in aromatic hydrocarbons, such as benzene or toluene, or in cyclohexane. Dispersions are obtained by polymerization in hydrocarbons having solubility parameters of <7.2, according to U.S. Pat. No. 4,083,834, for example in isobutane or 2,2,4-trimethylpentane, particularly if styrene-containing polymers are also prepared.

Polymers suitable for the novel process and having high contents of living bifunctional lithium polymers can be particularly readily prepared by the 2-stage polymerization process described in DE 40 30 400.

EXAMPLE 1

An initiator which was obtained by dimerizing 1 mol of 1-phenyl 1-(3,4-dimethylphenyl)-ethylene with lithium granules in a mixture of 3 mol of diethyl ether and 3 mol of ethylbenzene at below 35° C. was used.

After the reaction, ether and ethylbenzene were distilled off at below 30° C. until the ether content had decreased to <0.4 mol per mole of diphenylethylene and an initiator concentration of 1 mol/l was reached. The catalyst must be used immediately after its preparation since it begins to crystallize out after a few hours.

The polymerization experiment was carried out in a cylindrical, jacketed 6 l reactor having a height of 40 cm and a diameter of 15 cm. The reactor was equipped with a paddle stirrer which had a wall clearance of 5 mm during rotation and possessed paddle edges ground to form knives in the manner of a mixer (cf. FIGURE). The paddles were adjusted to 30° to the horizontal in the wall region for upward force and 290° in the center (60% of the diameter) for downward force, so that no unstirred zones were present. The drive used was a compressed-air motor having high torque. The reactor jacket could be cooled to −10° C. and heated to 70° C. Calibrated storage containers for diene (butadiene, isoprene), styrene and cyclohexane were present on the reactor. A brine-fed condenser was present on the storage container for diene, via which condenser the unconverted butadiene could be distilled back from the reactor into the receiver.

All operations required for the preparation of the telechelic structures were carried out in the strict absence of oxygen and moisture. The reactor was thoroughly boiled with a solution of butyllithium in hexane before being put into operation. Solvents, monomers and ethylene oxide were purified by distillation over triisobutylaluminum, and the solvent was furthermore titrated with the catalyst solution in the storage container until a slight orange color persisted.

For the preparation of the telechelic structures, the reactor was cooled to −10° C. and fed with 300 cm$^3$ of butadiene or isoprene, and 154 m$^3$ of the 1 molar catalyst solution were added. After 40–90 minutes close to the boiling point of the monomers, the color of the mixture had changed back from dark brown to a transparent light orange to dark yellow.

The solution, which had become viscous, was then slowly brought to 60° C. with thorough stirring and the addition of cyclohexane, some of the monomer being distilled back into the receiver when butadiene was used. At 60° C., the remaining monomer was added continuously at the rate at which it was consumed and cyclohexane was introduced continuously in an amount such that a solution having a polymer content of 30% by weight was formed.

For functionalization, the polymer solution was mixed with at least 1 mol of ethylene oxide per mole of lithium at below 40° C. with thorough stirring in the course of about 2 seconds. Immediately thereafter, the viscosity initially increased sharply and this was followed by the formation of an increasingly finely divided powder which was stirred for a further 3 hours.

For working up, about 20%, based on the volume of the solution before termination, of absolute methanol were added to the powder and the mixture was thoroughly stirred. After the stirrer had been switched off and following complete phase separation, the lower solvent layer was discharged. After this operation had been completed once or twice, the solution contained less than 1 ppm of alkali. Distilled water with which the solution was extracted by shaking as a precaution was found to be neutral. After the addition of 0.1%, based on the polymer, of stabilizer (Irganox 1076), the cyclohexane was distilled off under reduced pressure. In the termination with ethylene oxide, transparent telechelic structures were obtained.

We claim:

1. A process for the preparation of a telechele by reacting a polyfunctional, living polymer obtained by anionic polymerization with a functionalizing agent, wherein the reaction is carried out while stirring with a stirrer having in the form of knives blades as stirring elements, the latter being inclined relative to their plane of movement and passing over essentially the complete space occupied by the reaction mixture.

2. A process as claimed in claim 1, wherein an epoxide is used as the functionalizing agent.

3. A process as claimed in claim 1, wherein the living polymer contains styrene, butadiene or isoprene units.

* * * * *